US005695826A

United States Patent [19]

Escallon

[11] Patent Number: 5,695,826

[45] **Date of Patent: *Dec. 9, 1997**

[54] ELECTROSTATIC POWDER COATING APPARATUS AND METHOD

[75] Inventor: Eduardo C. Escallon, Elwood, Ind.

[73] Assignee: Terronics Development Corporation, Elwood, Ind.

[ * ] Notice: The term of this patent shall not extend beyond the expiration date of Pat. No. 5,279,863.

[21] Appl. No.: 82,596

[22] Filed: Jun. 25, 1993

Related U.S. Application Data

[62] Division of Ser. No. 419,531, Oct. 10, 1989, Pat. No. 5,279,863.

[51] Int. Cl.[6] .......... B05D 1/40

[52] U.S. Cl. .......... 427/477; 427/185; 427/458; 427/569; 118/309; 118/312; 118/325; 118/634

[58] Field of Search .......... 427/185, 477, 427/458, 569; 118/634, 309, 312, 325

[56] References Cited

U.S. PATENT DOCUMENTS

| | | | |
|---|---|---|---|
| 4,568,569 | 2/1986 | Wang | 427/431 X |
| 4,582,718 | 4/1986 | Escallon | 427/32 |

FOREIGN PATENT DOCUMENTS

| | | | |
|---|---|---|---|
| 559449 | 6/1958 | Canada | 118/630 |

*Primary Examiner*—Janyce Bell

*Attorney, Agent, or Firm*—Lundy and Associates

[57] ABSTRACT

An electrostatic powder coating apparatus comprising a powder reservoir, a gas flow injection chamber, a diffusion chamber and a coating chamber and method for coating a substrate or target objects. The injection chamber receives powder from the reservoir at a controlled rate. The powder particulates awe entrained by a gas flow within the injection chamber. The diffusion chamber receives the particulates from the injection chamber. The diffusion chamber deaccelerates the particulates and creates a particulate cloud. The coating chamber receives the particulate cloud. A housing encloses the coating chamber. The coating chamber is isolated from the ambient atmosphere. The coating chamber has a cloud inlet and a cloud outlet. The cloud flows through the coating chamber from the inlet to the outlet. One or more deflectors, within the chamber, define a passage and two or more pockets adjoining the substrate or target objects. The deflectors deflect the carrier gas from the pockets to the substrate or target objects. The substrate or target objects are transported within the chamber along the passage. Coating material within the passage is concentrated around the substrate or target objects. The coating chamber includes electrodes and voltage biasing means. The biasing means acts upon the substrate or target objects which are positioned within the passage. The particulates are electrostatically deposited upon the substrate or target objects within the passage.

37 Claims, 5 Drawing Sheets

ELECTROSTATIC POWDER COATING APPARATUS AND METHOD

This is a divisional of application Ser. No. 07/419,531 filed on Oct. 10, 1989, now U.S. Pat. No. 5,279,863.

BACKGROUND OF THE INVENTION

The subject matter of the invention relates to an electrostatic powder coating system, and more particularly to an electrostatic powder coating system which can coat both individual objects and continuous substrates.

Coating materials are applied to a great number of products for aesthetic or functional reasons, by a wide variety of methods and apparatus. Those methods and apparatus have a number of shortcomings. Coating systems utilizing solvents are subject to both the expense of solvents and the expense of disposing of the spent solvents in an environmentally acceptable manner. In hot melt applications or if the viscosity of the coating solutions are raised to decrease solvent usage, other rheology application problems arise.

Apparatus and methods for applying coating material in powder form to a substrate do not suffer from the above shortcomings, however, previous powder coating systems have variously been limited as to the minimum coating thickness which could be applied, the acceptable orientations and adjustability of the apparatus, and the uniformity of the applied coating.

While application methods and devices do exist, current technology is inadequate for applying a continuous, coherent and ultrathin coatings to a large variety of objects. Small objects, such as slugs, often need to be provided with a coating to improve and enhance their function and longevity. One example is metallic objects which are sintered or otherwise formed by powdered metallurgical or ceramic processes. Typical liquid processes encounter high surface tension forces between individual particles of the sintered material causing the liquid to be wicked into the slug or highly porous objects in which the larger pores (representing Faraday Cages) are not adequately coated leaving the exterior surface locally bare in some spots. Additionally, liquid coatings might be totally repelled in certain regions by disabling surface tension forces, such as those regions contaminated with dust, oil or the like. In either case, tiny voids or holidays (defects) in the coating occur, creating potential service problems.

Similarly, while application methods and devices do exist for coating continuous substrates, such as magnet wire, extrusions, strip and sheet materials, and the like, these methods either use relatively large amounts of solvents and are subject both to the expense of solvents and the expense of disposing of the solvents, or are limited by the coating material and the rheology problems associated with that coating material. These methods also have their limitations when ultrathin coatings of less than three (3) microns are desired.

Electrostatic powder coating techniques are also known. However, most of these involve applying the coating to the substrate by passing the substrate through a fluidized bed of particulate coating material. This method requires periodic down time to regenerate the fluidized material in the bed. Such processes also often result in coatings of nonuniform thickness. Uniform thickness depends upon the mobility or flow of the coating material when molten to render the coating uniform, and may not effectively negate gravitational forces on the coating material.

It is therefore highly desirable to provide an improved coating apparatus and method for both continuous substrates and a plurality of discrete objects.

It is also highly desirable to provide an improved coating apparatus and method which applies coatings on both continuous substrates or a plurality of discrete objects disposed in one of a variety of orientations.

It is also highly desirable to provide an improved coating apparatus and method which eliminates the use of solvents.

It is also highly desirable to provide an improved coating apparatus and method which applies continuous, coherent, highly uniform, and ultrathin coatings to substrates or a plurality of discrete objects of a variety of shapes.

It is also highly desirable to provide an improved electrostatic powder coating system which facilitates the application of a continuous, coherent, highly uniform, and ultrathin coatings to both continuous substrates and discrete objects with improved control of film build.

It is also highly desirable to provide an improved coating apparatus and method which is economically efficient and cost effective.

It is also highly desirable to provide an improved coating apparatus and method which utilizes a minimum quantity of coating material per coated object.

It is also highly desirable to provide an improved coating apparatus and method which has a new and improved electrostatic chamber.

It is also highly desirable to provide an improved coating apparatus and method which maximizes the quantity of target objects or substrate area which can be coated within a particular unit of time.

It is also highly desirable to provide an improved coating apparatus and method which has minimal maintenance requirements and yet is operationally efficient.

It is also highly desirable to provide an improved coating apparatus and method which allows for repetitive applications to substrate of different orientations.

It is also highly desirable to provide an improved coating apparatus and method which is capable of coating porous substances, with little surface penetration of the substrate.

It is also highly desirable to provide an improved coating apparatus and method which is economically efficient and cost effective.

Finally, it is highly desirable to provide an improved coating apparatus and method which incorporates all of the above mentioned features.

SUMMARY OF THE INVENTION

It is therefore an object of this invention to provide an improved coating apparatus and method for both continuous substrates and a plurality of discrete objects.

It is also an object of this invention to provide an improved coating apparatus and method which applies coatings on both continuous substrates or a plurality of discrete objects disposed in one of a variety of orientations.

It is also an object of this invention to provide an improved coating apparatus and method which eliminates the use of solvents.

It is another object of this invention to provide an improved coating apparatus and method which applies continuous, coherent, highly uniform, and ultrathin coatings to substrates or a plurality of discrete objects of a variety of shapes.

It is also an object of this invention to provide an improved electrostatic powder coating system which facilitates the application of a continuous, coherent, highly uniform, and ultrathin coatings to both continuous substrates and discrete objects with improved control of film build.

It is another object of this invention to provide an improved coating apparatus and method which is economically efficient and cost effective.

It is another object of this invention to provide an improved coating apparatus and method which utilizes a minimum quantity of coating material pew coated object.

It is still another object of this invention to provide an improved coating apparatus and method which has a new and improved electrostatic chamber.

It is another object of this invention to provide an improved coating apparatus and method which maximizes the quantity of target objects or substrate area which can be coated within a particular unit of time.

It is also an object of the invention to provide an improved coating apparatus and method which has minimal maintenance requirements and yet is operationally efficient.

It is also an object of the invention to provide an improved coating apparatus and method which allows for repetitive applications to substrates of different orientations.

It is yet another object of the invention to provide an improved coating apparatus and method which is capable of coating porous substances, with little surface penetration of the substrate.

It is another object of this invention to provide an improved coating apparatus and method which is economically efficient and cost effective.

Finally, it is an object of the invention to provide an improved coating apparatus and method which incorporates all of the above mentioned features.

In the broader aspects of the invention, what is provided is an electrostatic powder coating apparatus comprising a powder reservoir, a gas flow injection chamber, a diffusion chamber and a coating chamber and method using the same. The injection chamber receives powder from the reservoir at a controlled rate. The powder particulates are entrained by a gas flow within the injection chamber. The diffusion chamber receives the particulates from the injection chamber. The diffusion chamber deaccelerates the particulates and creates a particulate cloud. The coating chamber receives the particulate cloud. A housing encloses the coating chamber. The chamber is isolated from the ambient atmosphere. The chamber has a cloud inlet and a cloud outlet. The cloud flows through the chamber from the inlet to the outlet. One or more deflectors, within the chamber, define a passage and two or more pockets adjoining the substrate or target objects. The deflectors deflect the carrier gas from the pockets towards the substrate or target objects. The substrate or target objects are transported within the chamber along the passage. Coating material within the passage is concentrated around the substrate or target objects. The coating chamber includes electrodes and external voltage biasing means. The biasing means acts upon the substrate or target objects which are positioned within the passage. The particulates are electrostatically deposited upon the substrate or target objects within the passage.

BRIEF DESCRIPTION OF THE DRAWINGS

The above-mentioned and other features and objects of this invention and the manner of obtaining them will become more apparent and the invention itself will best become understood by reference to the following description of an embodiment of the invention taken in conjunction with the accompanying drawings, wherein.

DESCRIPTION OF A SPECIFIC EMBODIMENT

Figure 1:
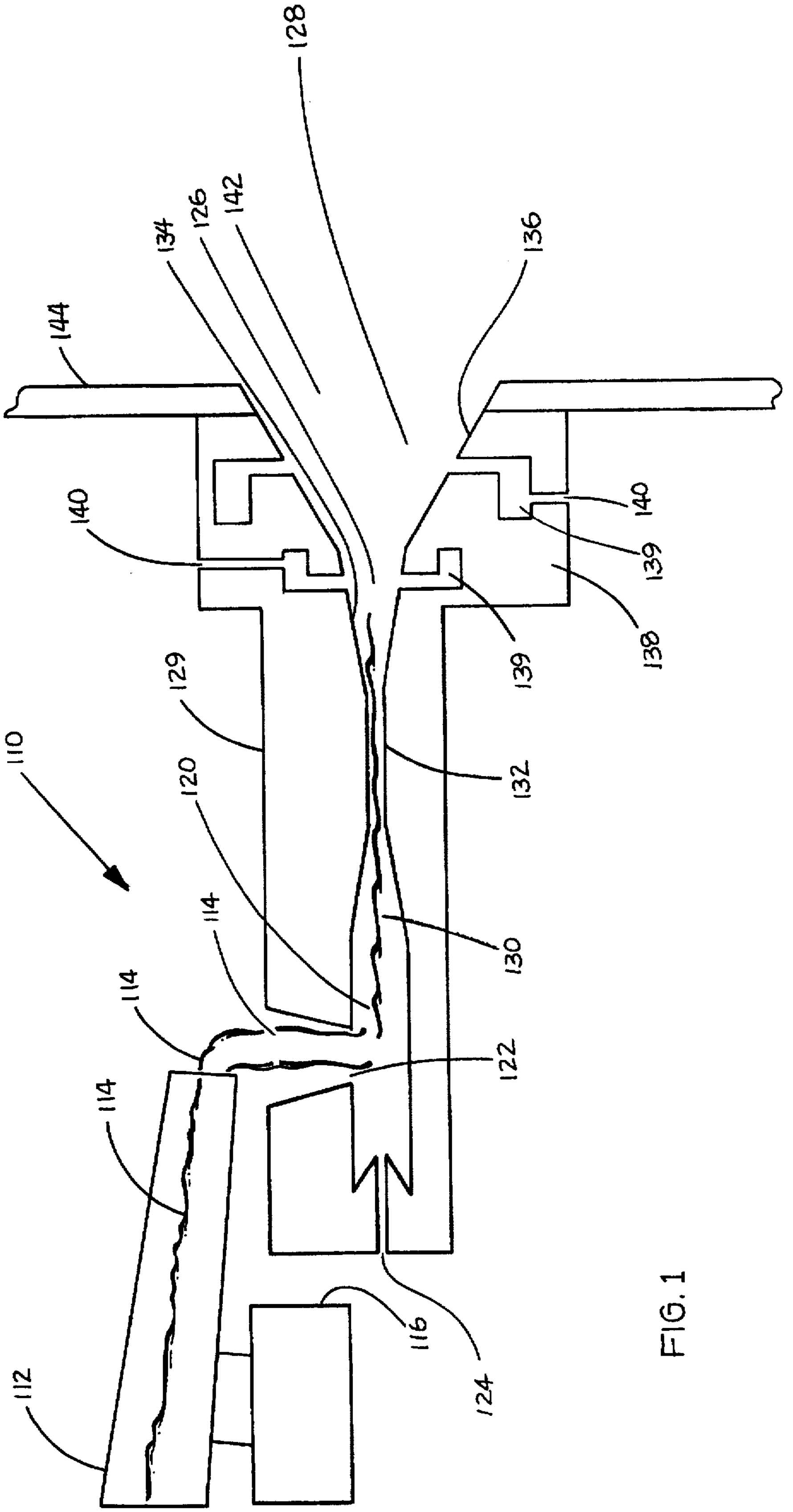
FIG. 1 is a fragmentary diagrammatical representation of the invention illustrating the flow of particulates through the diffuser.

Referring now to FIG. 1, the diffuser 110 of the electrostatic powder coating system of the invention is illustrated. Powder reservoir 112 houses is an inclined trough, which hold powder 114. Mechanical feeder 116 is connected to powder reservoir 112 such that when feeder 116 is activated, mechanical feeder 116 vibrates, causing powder 114 to exit reservoir 112. Powder 114 is gravity fed into gas flow injection chamber 120 at powder entrance 122.

Gas flow injection chamber 120 has a gas entrance 124 at which point gas is pressure-fed into gas flow injection chamber 120 at a desired velocity. Powder 114 is entrained by the gas. The entrained particles are accelerated axially of chamber 120 by the gas flow. Gas flow injection chamber 120 has a particulate exit 126 which allows the entrained particulates to enter diffusion chamber 128.

If the particulates are larger than desired or agglomerated, the particulates are deagglomerated or otherwise reduced in size by a deagglomerator such as disclosed in U.S. patent application filed herewith, entitled Deagglomerator and Method For Deagglomerating Particulate Material now U.S. Pat. No. 5,035,364.

Gas flow injection chamber 120 has a converging section 130, intermediate cylindrical section 132, and a diverging section 134.

Diffusion chamber 128 may include boundary layer controls 138 such as annular troughs 139 perimetrically positioned around diffusion chamber 128, supplied with supplemental gas through opening 140. Boundary layer controls 138 encourage flow along diffuser walls 136, which discourages the formation of deposits of coating material particles on diffuser walls 136, maximizes delivery of entrained powder through diffusion chamber 128, and maximizes divergence of the moving cloud of coating material particles, proportionately slowing the cloud to velocities suitable for efficient electrostatic deposition.

Figure 2:
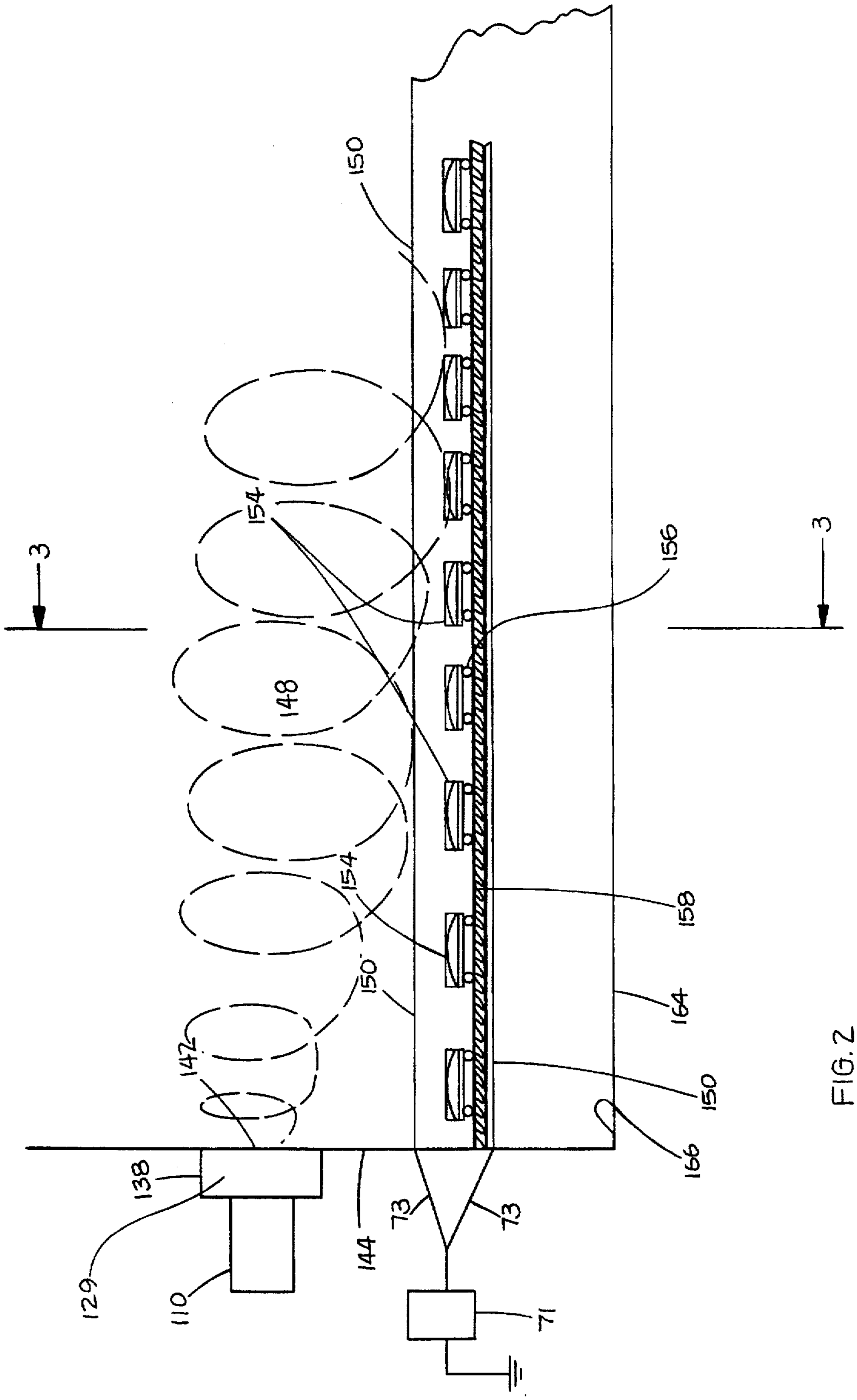
FIG. 2 is a fragmentary diagrammatical representation of the invention illustrating the discrete object coating apparatus of the invention with target objects on a conveyor with portions of the housing removed.
Figure 3:
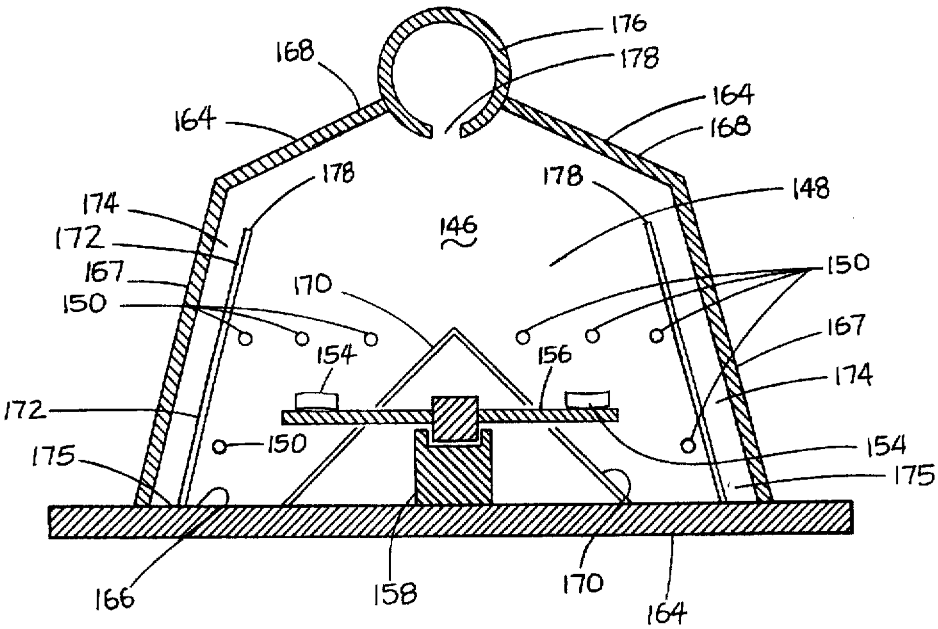
FIG. 3 is a cross sectional view of the coating apparatus of the invention illustrated in FIG. 2 taken substantially along the section line 3—3.
Figure 4:
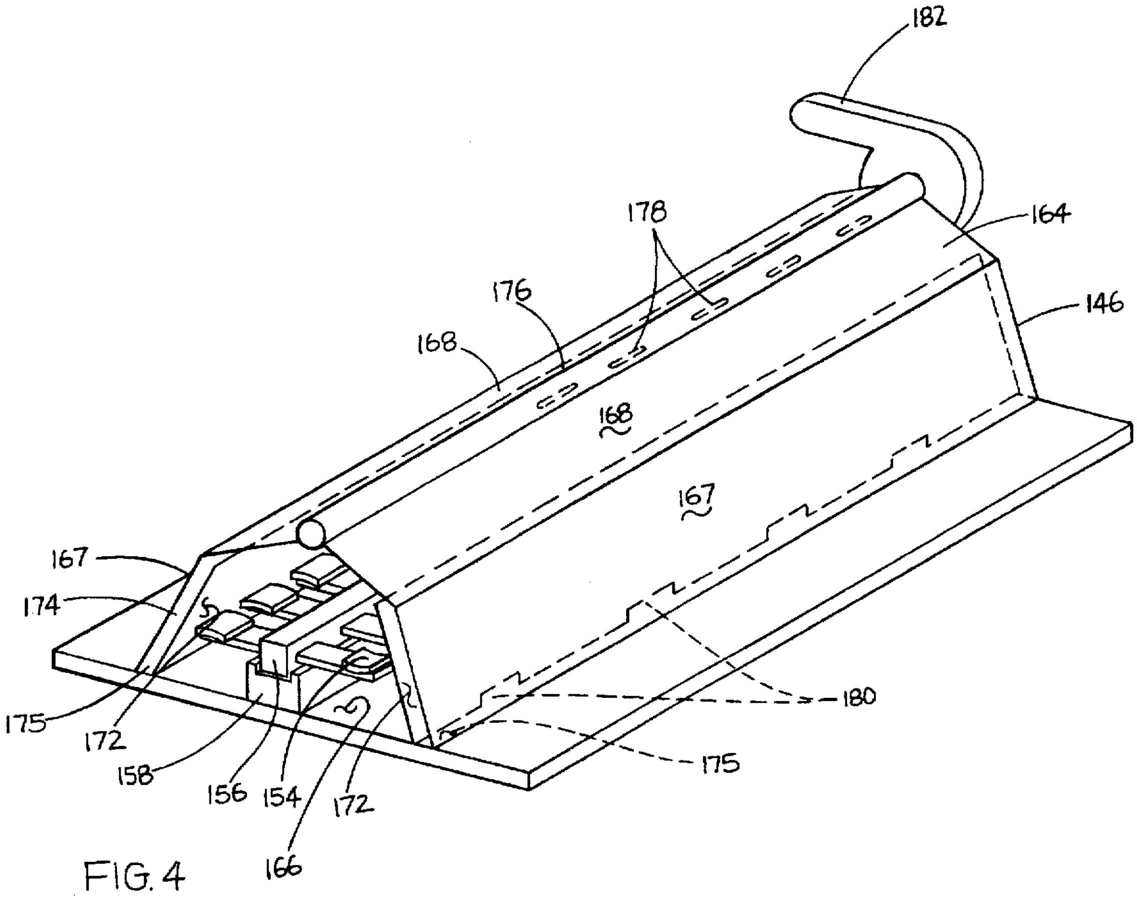
FIG. 4 is a perspective view of an embodiment of the coating apparatus of the invention illustrated in FIG. 2 with the near end of the housing removed.

Referring to FIGS. 2, 3, and 4, diffusion chamber 128 is joined to a main housing 164 by conduit 129. Main housing 164 has an electrostatic chamber 148 and one or more than one partition chambers 174, made discrete from electrostatic chamber or coating chamber 148 by partition walls 172, which are inclined inwardly to the substrate or target objects 154. The partition chambers 174 ate in communication only through partition openings 178, which are spaced apart from electrodes 150. Partition openings 178 comprise partition gaps which are above partition walls 172 and partition aperutures or access slots or return parts 180 which are adjacent to floor 166.

Partition walls 172 provide for portions of the particulate cloud entering partition chambers 174 through partition openings 178 to settle and remain separate from electrostatic chamber 148 thus removing excess particulate material. Partition walls 172 also confine the remaining portions of the electrostatic cloud in proximity to electrodes 150 and the substrate or target objects 154. The particulate portion of the cloud entering partition chambers 174 tends to be in excess and subject to settling, which unless separated from the substrate or target objects 154 could cause an uneven coating. Settled coating particles are removed from the collection surfaces of the partition chambers 174 and recycled.

Main housing 164 may have a variety of alternative shapes. One such shape is illustrated, in which main housing 164 has a flat floor 166, a front wall 144, an opposed rear wall 146, lower sidewalls 167 which are inwardly sloped from floor 166, and upper sidewalls 168 which are inwardly sloped from lower sidewalls 167. Diffusion chamber 128 communicates with electrostatic chamber 148 through a powder entrance 142 in a front wall 144 of a main housing 164. The particulate cloud enters electrostatic chamber 148 and moves longitudinally thereof. Within electrostatic chamber 148 below the level of powder entrance 142 are several electrodes 150.

Electrodes 150 are connected to high voltage source 71 by conductors 73 and are held at a near arc-over high voltage potential at which a corona discharge is formed and the carrier gas in chamber 148 is ionized. The positions, numbers, and shapes of electrodes 150 may vary depending upon the target objects or substrate 154 to be coated. Substrate or target objects 154 are held at or near a ground potential. The charged particulate moving under the influence of the electrical field is directed at and coats the substrate or target objects 154 which are at a lower potential than the electrodes 150. Particles of the coating material remain on substrate or target objects 154 as a result of continuing electrostatic force interactions, presence of adhesive, surface tension, and other forces associated with melting the coating material where temperatures are appropriate, and other means.

Referring now to FIG. 3, a cross sectional view of main housing 164 and the electrostatic chamber 148 and the structure therein is illustrated. Electrodes 150 are positioned along the length of electrostatic chamber 148 and form a configuration shaped geometrically similar to the surface to be coated.

A conveyor 156 transports substrate or target objects 154 to be coated within electrostatic chamber 148. Conveyor 156 has a support mount 158 and a conveying mechanism 157, which is transported on support mount 158. Target objects 154 rest upon target object support arms 159 of conveying mechanism 157. In specific embodiments, conveyor 156 may extend through a front conveyor opening and a rear conveyor opening in main housing 164 (not shown) or conveyor 156 could run continuously or intermittently and could be loaded and unloaded by conventional means. In other embodiments, conveyor 156 could be a continuous ribbon or web or a mechanical carrier as shown.

Shields 170 are utilized to protect the conveyor apparatus from becoming coated with particulates in the electrostatic zones such that only a portion of target object support arms 159, and the whole of target objects, are exposed to the particulates. The shields 170 are composed of various nonconductive plastic materials which would include polyethylene, polypropylene, fiberglass, rubberized material, synthetics, or other suitable materials.

Baffles or partition walls 172 are placed within the electrostatic chamber in order to confine the particulate cloud in closer proximity to substrate or target objects 154. This maximizes the efficiency of the coating process and minimizes wasted material. Access slots 180 are placed in partition walls 172 near floor 166 of the electrostatic chamber 148, such that excess particulates can settle and/or escape the intense electrostatic zone of the coating area or charging zone 74 and flow into particulate recovery area 175. This flow further will be described hereinafter with regard to a specific embodiment and reference to FIGS. 5 through 11.

Main housing 164 has an exhaust duct 176 which has exhaust holes or exhaust apertures 181. Exhaust duct 176 which is connected to negative pressure source 182, creates pressure gradients in electrostatic chamber 148 and partition chambers 174. Exhaust duct 176 in the embodiment illustrated in FIGS. 1 through 4 adjoins upper sidewalls 168 of main housing 164. The pressure gradients assist the particulate cloud in moving longitudinally from the diffuser towards rear wall 146 of main housing 164 and encourage the flow of gas through partition chamber 148 and into exhaust duct 176. To encourage this flow exhaust apertures 181 are increased in number and size towards rear wall 146 of main housing 164.

Referring to FIGS. 5 through 11, an apparatus designed specifically to coat continuous substrates is shown including housing 164 with a plurality of deflectors 16 which define a substrate passage 30 and surrounding peripheral pockets 56. A substrate transporter 34 moves substrate 32 through substrate passage 30. Substrate 32 may be one or mote continuous filaments or bars, or continuous strips or sheets. In a preferred embodiment of the invention, substrate 32 is moved through a substrate entrance 38 and an opposed substrate exit 40. Substrate entrance 38 is preferably below and separated from the carrier gas inlet or powder entrance 142 by shield 41. Where substrate 32 is a continuous filament bar or strip, transporter 34 may include a spool of uncoated substrate, a spool of coated substrate, and payout and takeup mechanisms as shown.

Figures 8, 9, 10, 11:
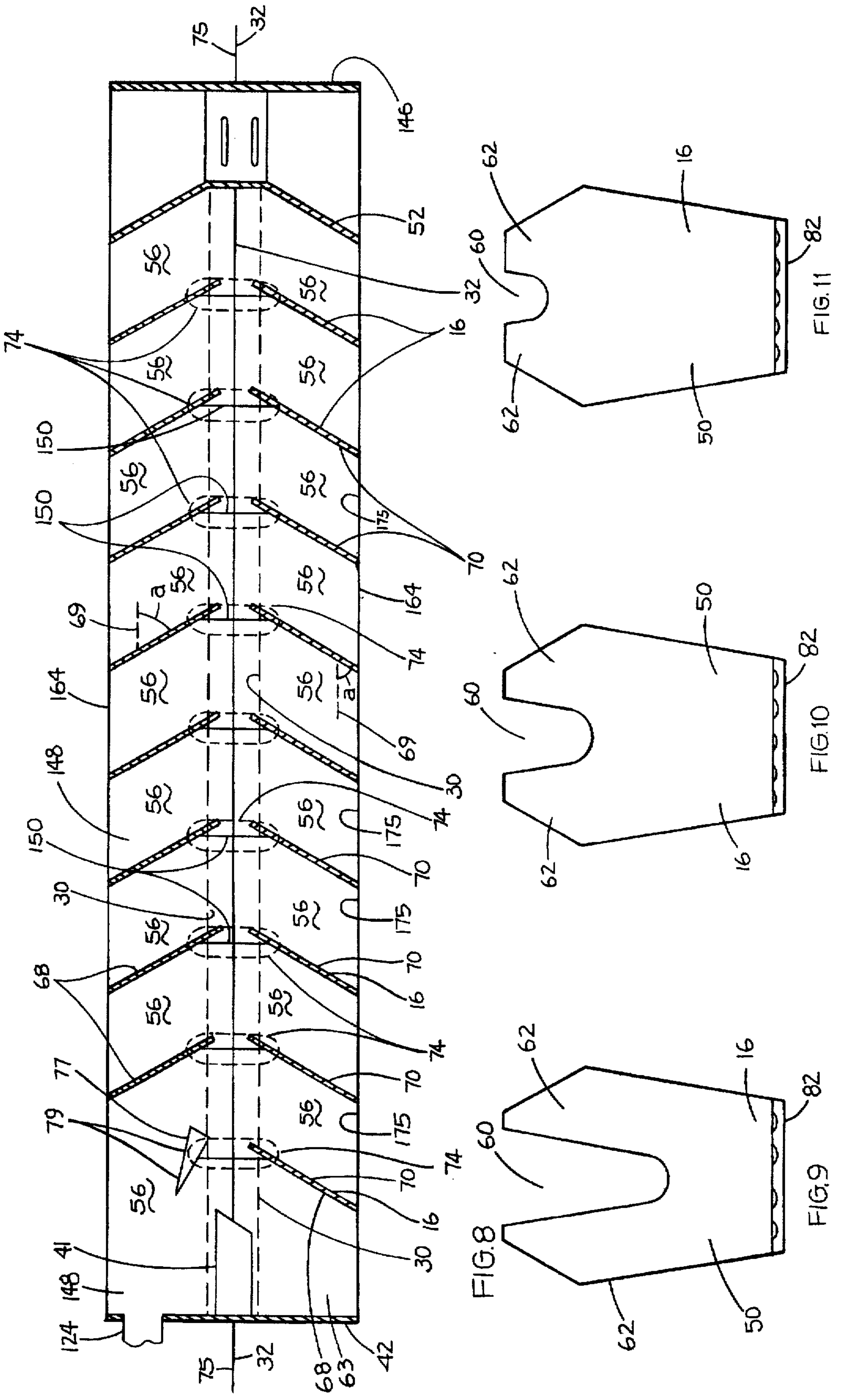
FIG. 8 is a fragmentary longitudinal cross-sectional view of the substrate coating apparatus of FIG. 6.
FIG. 9 is a front plan view of a deflector of the substrate coating apparatus of the invention.
FIG. 10 is a front plan view of another deflector of the substrate coating apparatus of the invention.
FIG. 11 is a front plan view of yet another deflector of the substrate coating apparatus of the invention.

The transverse dimensions of substrate passage 30 are defined by the dimensions of apertures 60 of deflectors 16. In a specific embodiment of the invention, apertures 60 are larger adjacent inlet 38 and smaller adjacent outlet 40, and substrate passage 30 converges in the direction of transport of substrate 32. In a specific embodiment, apertures 60 of deflectors 16 within chamber 148 are preferably all aligned, as shown in FIG. 8.

Dividers 54 consisting of two or more adjoining channel deflectors 16 may separate electrostatic chamber 142 into two or more subchambers 56 and permit gas flow, preferably, only through subchamber apertures 60 of channel deflectors 16 of dividers 54. In a specific embodiment of the invention in which dividers 54 each consist of a pair of channel deflectors 16, arms 62 of an upper channel deflector 16 overlap arms 62 of a lower channel deflector 16.

Deflectors 16 are disposed individually and do not form dividers 54. Gas can thus flow through aperture 60 of a deflector 16 and also around deflector 16.

Deflectors 16 each have an upper surface 68 and a lower surface 70 in a horizontal orientation. Since the orientation of housing 164 can be varied as needed in a particular use, identities of upper and lower surfaces 68, 70 will vary with the orientation of housing 164. In a specific embodiment, the surfaces 68, 70 are planar and deflectors 16 are formed of relatively thin sheet dielectric material and each provided with a sweep or gasport 82 as will be described hereafter.

As illustrated in FIGS. 5 through 8, deflectors 16 are preferably sloped in the direction of the movement of the cloud such that an acute angle "a" is defined between upper surface 68 and the horizontal, represented in FIG. 8 by substrate 32 or dashed line 69. This acute angle is greater than the angle of repose of coating material settling on upper surfaces 68. The specific angle is selected together with the voltage and air flows to optimize coating as desired.

The coating material is urged to flow within substrate passage 30 generally toward substrate 32 so that the cloud material will converge toward substrate 32 and be retained on substrate 32. Various means may be used to supply kinetic energy to the coating material to urge the coating material toward the substrate; such as, for example, electrical fields and air movement directed toward substrate 32. Retention of the coating material on substrate 32 is provided by electrostatic attraction, presence of adhesive, surface tension, and other forces associated with melting the coating material where temperatures are appropriate, and other means.

In the specific embodiment of the invention, substrate 32 is an electrically conductive material, electrodes 150 are disposed in chamber 148 and a voltage differential is applied between substrate 32 and electrodes 150 by means of an electrical source 71. Electrodes 150 are connected to electrical source 71 by a conductor 73. Electrodes 150 adjoin substrate passage 30 and are spaced apart from housing 164 and from each other along axis 75 of chamber 148. Preferably all portions of the chamber 148 are non-conducting, to prevent electrical source 71 from imposing a voltage differential between substrate 32 and any part of the substrate coating apparatus 10 of the invention other than electrodes 150. This is accomplished in a specific embodiment by use of electrically insulating polymeric materials.

Referring to FIG. 8, each electrode 150 is surrounded by a charging zone 74. The voltage potential between electrodes 150 and substrate 32 is preferably sufficient to maintain a corona discharge within the charging zones 74 around each electrode 150 without arc-over. The electric field may be varied by the voltage used, the spatial geometry and concentration of the electrodes to the substrate.

In a specific embodiment, each electrode 150 is affixed to a deflector 16 bordering aperture or apertures 60. In other embodiments, not all deflectors 16 need have an electrode 150. Each electrode is "upstream", that is, in a direction opposite to the predominant direction of flow of carrier gas from an aperture 60. Different orientations and arrangements of electrodes 150 may be used to vary the corona discharge for other target objects, substrates and conditions.

The flow of carrier gas through apertures 60 is generally occluded by the charging zones 74 (shown in FIG. 8 in dashed lines) of the electrode 150. For carrier gas, including dispersed coating material, to flow through the apertures 60 the gas must generally first flow through the charging zone 74 of the electrode 150.

Sweeps or gas ports 82 are provided within chamber 148 to provide additional kinetic energy to the cloud of dispersed coating material flowing through electrostatic chamber 148. Gas ports 82 are connected to carrier gas source 22 or some other gas source of the same or a different gas and are each independently controlled by valving, an orifice or other means. Gas ports 82 release carrier gas in a direction which impels coating material within substrate passage 30 generally toward substrate 32. In a specific embodiment of the invention utilizing electrodes 150, each deflector 16 is provided with a sweep 82. Gas flows from sweep 82, preferably laminarly, over the upper surfaces 68 of each deflector 16, sweeping coating material from deflectors 16, and moving the cloud of particulate material toward the changing zones 74. In other specific embodiments, one or more deflectors 16 are eliminated and the carrier gas is relied upon to converge the particulate material up on the substrate or objects to be coated.

In a specific embodiment, attachment elements 77 are shaped so as to not accumulate settled coating material which could drop off onto substrate 32. For example, attachment elements 77 may have the shape of a narrow wedge oriented so that all of its surfaces are disposed at an angle greater than the angle of repose of the coating material. Attachment element 77 may also incorporate sweeps or gas ports 82 to sweep the surface thereof and/or to provide additional kinetic energy to the dispersed coating material in chamber 148.

A vacuum source 182 communicates with chamber 148 through a vacuum source connection 85 and a vacuum plenum 84. See FIGS. 4, 5 and 6. Gas outlet 26 is separated from vacuum plenum 84 by plenum wall 86. Slots 88 in plenum wall 86 provide for communication between gas outlet 26 and vacuum plenum 84. In a specific embodiment, slots 88 are lateral to substrate 32 to prevent any accumulated settled coating material from falling onto substrate 32 and are longitudinally disposed, elongated, and oval shaped to prevent a venturi effect, which could result in sufficient turbulence to remove coating material from substrate 32.

Figure 5:
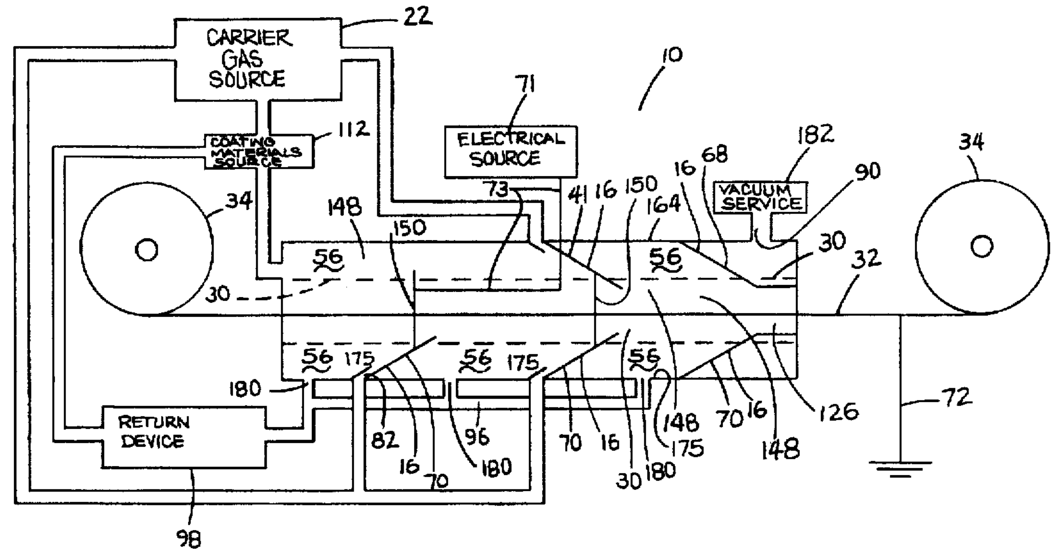
FIG. 5 is a diagrammatical view of the entire coating apparatus of the invention connected to the substrate coating apparatus of FIGS. 6 through 11, although it should be understood that the discrete object coating apparatus shown in FIGS. 2 through 4 could be substituted for the substrate coating apparatus illustrated.
Figure 6:
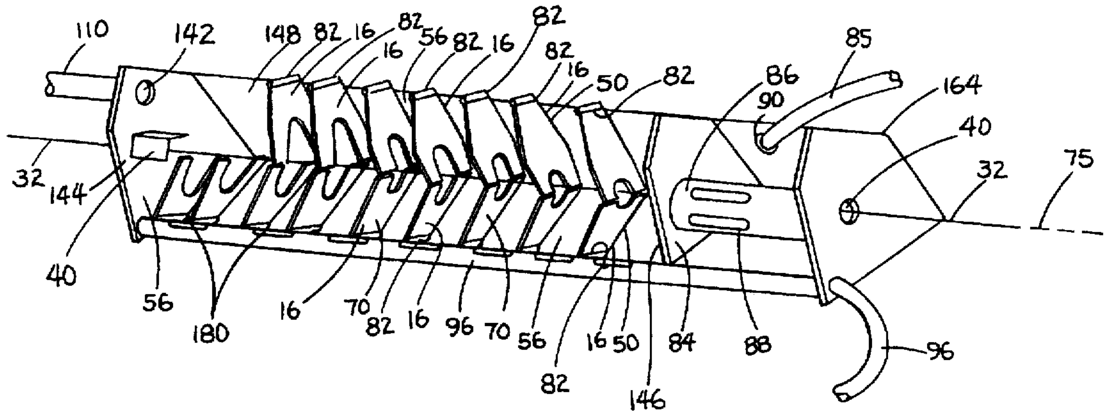
FIG. 6 is a fragmentary, perspective view of the substrate coating apparatus of the invention with a portion of the housing removed.

Referring to FIGS. 5 and 6, housing 164 has one or more deposition or collection surfaces 175, which may be part of one or more bottom sidewalls 166, to receive settled coating material. Deposition or collection surfaces 175 adjoin deflectors 16 and may have return ports 180 for removal of the settled coating material. A return tube 96 including return ports 180, may form all or part of a bottom 166. Return tube 96 may be connected to a return device 98 which provides a vacuum for removal of coating materials settled on deposition or collection surfaces 175. Provision may be made for recycling of removed coating material to coating material source 20.

Electrostatic chamber 148 will vary dependent upon the objects to be coated and the configuration thereof. For example, wherein the continuous substrate is a strip or ribbon of material, the strip or ribbon may be trained to move upwardly in a generally vertical direction, the cloud of particulate material may enter at the bottom of the chamber 148 with the cloud generally moving upwardly towards the top end of electrostatic chamber 148, with a plurality of dividers 16 mounted progressively closer to the substrate to be coated and at an angle with regard to the substrate in a spaced apart relation. In a specific embodiment, sweeps 82 are provided for each of the dividers 16 to generally converge the cloud onto the strip being coated as described herein. When both sides of a strip are to be coated the particulate cloud is introduced on both sides of the strip and a similar systems dividers 16 may be provided on both sides of the strip, one being a mirror image of the other.

In still other embodiments, a strip or sheet may be coated by training the strip or sheet through the electrostatic chamber 148 at an angle with the cloud being injected into the electrostatic chamber 148 at the lower end and generally passed upwardly towards the upper end or the reverse thereof with the cloud being injected at the upper end and the air passed towards the lower end.

Figure 7:
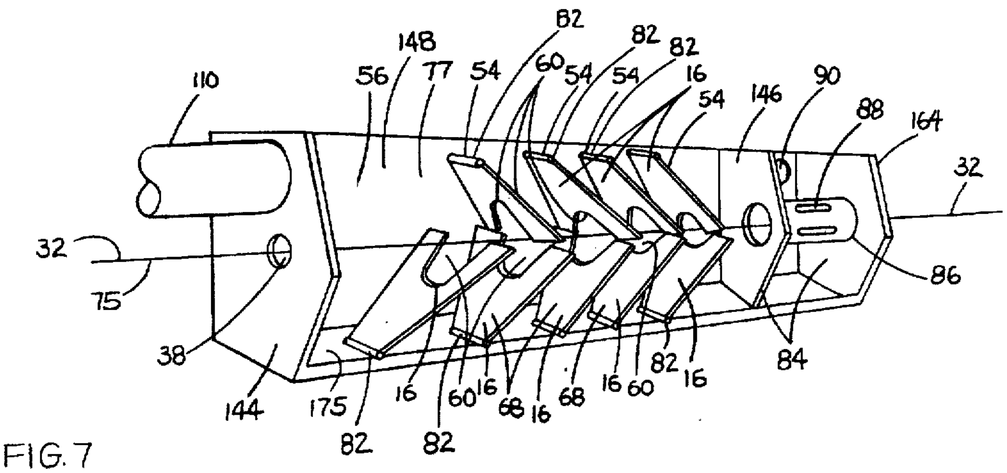
FIG. 7 is a fragmentary, perspective view of an alternate substrate coating apparatus of the invention with a portion of the housing removed taken perpendicularly of FIG. 6.

When only one side of a strip or sheet is to be coated only one half of chamber 148, as shown in FIGS. 6, 7, and 8, need be provided.

In all of the above configurations, the cloud moves in the direction of movement of the substrate or objects to be coated, and the gravitational movement of the particulate must be taken into consideration. The gravitational movement of the particulate plays the more important part when the cloud is injected above the strip to be coated in a horizontal configuration, a lesser part when the strip is trained to move angularly with reference to either the vertical or the horizontal, and minimally when the strip is trained to remove generally vertically through the electrostatic chamber 148.

The above described coating apparatus 10 of the invention is varied depending upon the substrate or discrete articles to be coated.

Where thicker coatings are desired or where a continuous substrate such as magnet wire is desirably coated at higher speeds, one or more electrostatic coating chambers 148 may be positioned in tandem.

When chambers 148 are placed in tandem, a common exhaust and air outlet may be utilized by having the cloud flow in the same direction as the substrate or objects are moving in the first chambers 148 and having the cloud move in a direction opposite to the movement of the substrate or objects in the latter chambers 148 with the exhaust and air outlet being in the middle. This apparatus is not only advantageous from the economy of the exhaust and air outlet, but places the diffusers at opposite ends of the row of tandem chambers 148. Also, advantageous is the fact that the highest particulate concentration in the cloud passing through the tandem chambers 148 are at the opposite ends, thus enhancing the coating process and allowing for maximum coating builds, if desired.

In this fashion, the desired coating usually can be accomplished, limited only by particulate concentration consideration, i.e., space charge. In no event can the voluminous expansion ratio exceed that of a conical chamber having an apex angle of 120°, or the concentration of particulate material in the cloud exceed the flammability concentration.

Thus, where extremely wide strips are desirably coated one or more electrostatic chambers 148 can be positioned side by side in parallel with each chamber 148 having its own diffusion chambers 128, housing 164, exhaust ducts 176, vacuum source 182 and gas outlet 90. In each of these embodiments, the electrodes 150 generally have a shape geometrically similar to the shape of the substrate or objects being coated. For example, electrodes 150 generally define a plane in either a strip or sheet coater and electrodes 150 generally define a cylinder surrounding the substrate in a wire coater. Space charge considerations may however may hurt deposition effeciencies in concentrated cloud regions adjacent deposition zones.

In operation of the latter embodiment of the invention, a substrate is transported through the coating chamber of coating apparatus 10 of the invention, from the general vicinity of substrate inlet 38 to the general vicinity of a substrate outlet 40, preferably at a constant velocity. The coating material is preferably dispersed in carrier gas prior to the entry of carrier gas into chamber 148 through inlet 142. As coating material enters chamber 148, a cloud of coating material particles dispersed in carrier gas is formed within chamber 148, which flows along with the carrier gas. The cloud flows from gas inlet 124 to gas outlet 90 in the same or opposite direction as the direction of transport of substrate 32. Deflectors 16 direct carrier gas generally toward substrate passage 30 from subchambers 56. Dividers 54 channel carrier gas through subchamber openings 60 from one subchamber to the next subchamber. Entraining coating material in a carrier gas may be accomplished in a variety of ways, one of which is described in United States Patent Application entitled "Deagglomerator and Method For Deagglomerating Particulate Material", filed herewith.

The cloud of dispersed coating material is introduced into chamber 148 in motion in a direction generally parallel to the direction of transport of substrate 32 toward carrier gas outlet 90 and substrate exit 40. As the carrier gas and coating material flow in chamber 148, dispersed coating material cloud expands into substrate passage 30 and the remainder of chamber 148. In a specific embodiment of the invention, carrier gas inlet 142 may be separated from substrate entrance 38 by shield 41 to prevent any material accumulated on the side wall or elsewhere to fall onto substrate 32 when such would cause a coating defect.

As the cloud flows through chamber 148, coating material entering substrate passage 30 is propelled toward substrate 32, which the coating material contacts and, some or all of the coating material remains attached to substrate 32. Coating material within substrate passage 30, which does not become attached to substrate 32, is moved by flow of carrier gas through an aperture 60 again propelled toward substrate 32 and the process is repeated.

In a specific embodiment of the invention, as the cloud of coating material enters a subchamber 56, the dispersion is divided between a portion that by-passes around electrode 150 and a portion that passes through the charging zone 74 of electrode 150. Since the charging zones 74 of electrodes 150, occlude substrate passage 30, carrier gas and dispersed coating material bypassing an electrode 150 flows through a pocket or subchamber 56 rather than along substrate passage 30.

Electrodes 150 are disposed adjacent subchamber openings 60 and carrier gas and entrained coating material, in order to pass from a subchamber 56 to the next subchamber 56, travels through the charging zone 74 of the electrode 150. Coating material particles are charged in charging zones 74, are forced towards substrate 32.

After flowing within the last subchamber 56, carrier gas and any remaining dispersed coating material leaves chamber 148 and enters vacuum plenum 84. The coating material settles as the carrier gas flows through chamber 148 and preferably little coating material remains dispersed in the carrier gas when the carrier gas is removed by vacuum source 182. If desired, coating material removed by vacuum source 182 can be recycled to coating material source or powder reservoir 112.

In a specific embodiment of the invention, return device 98 can remove settled coating material from deposition or collection area 175 intermittantly as coating material accumulates while substrate 32 is being coated, since the settled coating material being removed is within pockets 56 and not substrate passage 30. The return device 98 must, however, not draw so much vacuum so as to cause excess turbulence or redirect gas flow or otherwise alter the gradient established so as to disrupt the coating process.

In a specific embodiment of the invention, sweeps or gas ports 82 impel coating material in the general direction of, concentrate coating material around substrate 32, disperse settled coating material, and add kinetic energy to dispersed coating material to accomplish the objectives of the invention.

Where the dispersion impinges on a deflector 16, flow is redirected toward substrate passage 30. The predominant directional flow of the carrier gas and the entrained coating material remains in the direction of transport of the substrate 32, however, some flow is in other directions since there is some turbulence and eddying within pockets 56. As the cloud moves through chamber 148, dispersed coating material particles also move gravitationally, electrostatically and aerodynamically in a direction transverse to axis 75 and the direction of transport of substrate 32. Movement is both into and spaced from substrate passage 30.

The movement of the particles in combination with the flow of carrier gas and transport of substrate 32, may set up a generally perpendicular concentration gradient in the coating material cloud formed within chamber 148. Invariant conditions in chamber 148, such as transport speed and carrier gas flow rate and defining the particle size of coating material may establish an equilibrium in the coating material cloud and a constant gradient. The gradient would be in median particle size of populations of coating material particles and/or in density of coating material particles along different portions of the cloud. Turbulence within chamber 148 introduced by structures within chamber 148, such as deflectors 16 and electrodes 30 or by gas ports 82, must necessarily be insufficient to prevent the gradient from forming.

Changes can be made in the gradient by changing a variety of factors. The length of the gradient can be changed. Additional kinetic energy can be supplied to coating material particles. Turbulence within chamber 148 can be changed. The density and size of particles supplied to chamber 148 can be changed. Settled particles can be redispersed. Charging zones 74 of electrodes 150 or other means for propelling particles within substrate passage 30 toward substrate 32 and other factors can be changed. Some of these changes can be provided, for example, by: changing the length of subchambers or number of subchambers, changing the velocity of carrier gas entering through gas inlet 124, changing the vacuum provided by vacuum source 83, changing gas flow through gas ports or sweeps 82, rearranging or changing the number of deflectors 16 and/or electrodes 150. Changes in the gradient can change characteristics of the coating imparted to substrate 32 such as changes in uniformity and thickness. Controls automatic or manual could also be provided to make changes of variable features of the apparatus 10 as desired.

As can be seen from the great variety of factors having some possible influence on the gradient, the gradient within chamber 148 would not generally be a simple linear change from one end of chamber 148 to the other, but rather more complex variations within and between subchambers 56 and within and between substrate passage 30 and subchambers 56.

The improved electrostatic powder coating apparatus and method is economically efficient, cost effective, utilizes a minimum quantity of powder per coating, utilizes a new and improved electrostatic chamber and powder injection apparatus, maximizes the quantity of target objects or substrate area which can be coated within a particular unit of time, has minimal maintenance required and easily allows for repetitive applications. Further, the apparatus and method is easily adjustable to apply continuous highly uniform, thin coatings to substrates or a plurality of discrete objects of a variety of shapes and orientation and to provide continuous, coherent ultrathin coatings to both continuous substrates and discrete objects with improved control of film build over and above prior art apparatus and methods.

While there have been described above the principles of this invention in connection with specific apparatus, it is to be clearly understood that this description is made only by way of example and not as a limitation to the scope of the invention.

What is claimed is:

1. A coating apparatus comprising a housing enclosing a coating chamber, said coating chamber being isolated from the ambient atmosphere, said coating chamber having a carrier gas inlet and a carrier gas outlet, means for providing carrier gas flow in said coating chamber from said carrier gas inlet to said carrier gas outlet, means for supplying coating material dispersed in said carrier gas, one or more deflectors disposed within said chamber, said deflectors defining a passage through which the articles to be coated are passed, said passage being in said coating chamber, said deflectors defining two or more pockets adjoining said passage, said deflectors being disposed to deflect said carrier gas from said pockets toward said passage, means for transporting articles to be coated within said coating chamber along said passage, and means for concentrating said coating material within said passage, said concentration means including one or more electrodes within said enclosure, said electrodes being spaced apart from each other, said electrodes adjoining said passage, said electrodes each defining a charging zone surrounding one of said electrodes, an electrical source connected to each of said electrodes, said electrical source imposing a voltage differential between said electrodes and the articles to b coated, said housing having partition walls dividing said coating chamber into an electrostatic chamber and a partition chamber, said partition chamber walls being sloped inwardly.

2. The coating apparatus of claim 1 wherein said partition chamber walls have openings and gaps and apertures, said partition gaps being larger than said partition openings, said partition gaps being above said partition openings.

3. The coating apparatus of claim 1 further comprising an exhaust duct connected to a negative pressure source, said exhaust duct extending longitudinally of said housing above said electrodes, said exhaust duct having a plurality of exhaust apertures to permit flow of gas into said duct.

4. The coating apparatus of claim 1 wherein said partition chamber walls further comprise partition gaps adjacent said exhaust duct.

5. The coating apparatus of claim 1 wherein said partition chamber walls further comprise a plurality of apertures increasing in size in a direction extending out from said carrier gas inlet.

6. The coating apparatus of claim 1 wherein said housing has a floor and a plurality of side walls, and wherein at least a portion of said gas flow in said partition chambers is adjacent said floor through said partition chambers adjacent said side walls and out of said partition chambers.

7. The coating apparatus of claim 1 wherein said concentrating means includes an electrostatic means for creating an electrostatic zone within said electrostatic chamber, said electrostatic zone receiving and ionizing said carrier gas and dispersed coating material, said electrostatic chamber enclosing said electrostatic means and said transporting means such that said carrier gas and dispersed coating material is constrained to a definite volume.

8. The coating apparatus of claim 7 further comprising baffling means interposed within said electrostatic chamber and cooperating with said electrostatic means for further confining said dispersed coating material in close proximity to said means.

9. The coating apparatus of claim 7 further comprising exhaust means for providing pressure gradients, said pressure gradients assisting the transport of said carrier gas and dispersed coating material through said electrostatic chamber, said exhaust means removing excess coating material.

10. The coating apparatus of claim 1 further comprising biasing means for biasing said articles to be coated with respect to said electrostatic means such that said articles attract said dispersed coating material.

11. The coating apparatus of claim 1 wherein said coating material supply means includes a powder reservoir supplying coating material powder, an injector having a gas flow injection chamber receiving said powder from said reservoir, said injector entraining said powder into flowing gas, a diffuser receiving said flowing gas and entrained powder from said gas flow injection chamber, said diffuser decelerating said powder entrained in said gas flow, said diffuser causing said flowing gas and entrained powder to flow into said electrostatic chamber, said electrostatic chamber receiving said powder entrained in said gas flow from said diffuser, said diffuser including a diverging frustoconical section contiguous with and coaxial of said injection chamber.

12. The coating apparatus of claim 11 wherein said diffuser further comprises a boundary layer control.

13. The coating apparatus of claim 11 wherein said boundary layer control further comprises an annular trough circumferentially positioned around said diffuser, and means for introducing air into said annular trough.

14. The coating apparatus of claim 11 further comprising a plurality of said boundary layer controls.

15. The coating apparatus of claim 11 wherein said injector further comprises a converging frustoconical section and a diverging frustoconical section, said converging section being continuous with said diverging section, said diverging section having a powder exit of said injection chamber.

16. The apparatus of claim 1 wherein said injector further comprises a converging frustonconical section and a diverging frustoconical section, said converging section being continuous with said diverging section, said diverging section .having a powder exit of said injection chamber, a coaxial cylindrical section interposed between said converging and diverging sections.

17. The coating apparatus of claim 1 wherein said concentrating means includes said electrostatic chamber and said electrodes and a ground electrically connected to said articles to be coated positioned within said chamber, and further comprising said housing having a plurality of inclined walls, an inclined ceiling, and a floor, and wherein said electrostatic chamber has a plurality of electrodes extending longitudinally of said electrostatic chamber.

18. The coating apparatus of claim 1 wherein said concentrating means includes said electrostatic chamber including high voltage electrodes and a ground electrically connected to said articles to be coated positioned within said chamber, and said transporting means includes a conveyor further comprising a support mount and a conveying mechanism transported upon said mount, said conveying mechanism having support arms for said articles to be coated.

19. The coating apparatus of claim 18 wherein said support arms are electrically grounded, whereby said articles to be coated are biased.

20. The coating apparatus of claim 19 wherein said support arms are electrically grounded, whereby said articles to be coated are biased.

21. The coating apparatus of claim 19 further comprising shields isolating said support mount and said conveying mechanism, exclusive of said support arms adjacent said articles to be coated from said particulates, whereby only a portion of said support arms and the whole of said articles are exposed to said powder.

22. The coating apparatus of claim 19 further comprising a plurality of baffles confining said powder in close proximity to said electrodes and said conveyor.

23. The coating apparatus of claim 22 wherein said baffles further comprise a pair of opposed inclined baffles.

24. The coating apparatus of claim 23 wherein each of said baffles has a plurality of aperatures, said apertures allowing excess particulates to flow downwardly and outwardly, whereby said particulates can be recovered for reuse.

25. The coating apparatus of claim 23 wherein said concentrating means includes an electrostatic chamber, said electrostatic chamber including high voltage electrodes and a ground electrically connected to target objects positioned within said chamber, an exhaust system operatively connected to said electrostatic chamber, said exhaust system partially removing excess powder and assisting the transport of said powder longitudinally of said electrostatic chamber.

26. The coating apparatus of claim 25 wherein said exhaust system further comprises an exhaust duct extending longitudinally of said electrostatic chamber, and an exhaust blower operatively connected to said exhaust duct, said exhaust duct having aperatures communicating with said electrostatic chamber, whereby said exhaust system provides pressure gradients within said electrostatic chamber.

27. The coating apparatus of claim 1 wherein said housing comprises an electrostatic chamber and two partition chambers, said partition chambers being separated from said electrostatic chamber by partitions between said chambers, communication between said chambers being provided by gaps in said partition walls.

28. The coating apparatus of claim 1 wherein said transporting means is a conveyor extending within said electrostatic chamber, said conveyor transporting articles to be coated within said electrostatic chamber.

29. The coating apparatus of claim 1 wherein said concentrating means includes electrodes disposed within said electrostatic chamber about said transporting means, said electrodes being spaced apart from said partition openings, a high voltage source being in electrically conductive relationship with said transporting means and said electrodes, said high voltage source imposing a high voltage potential between said electrodes and said transporting means.

30. The coating apparatus of claim 1 further comprising a negative pressure source communicating with said electrostatic chamber adjacent said partition chambers.

31. The coating apparatus of claim 1 wherein said transporting means includes conveying means for positioning said objects to be coated within said zone.

32. The coating apparatus of claim 1 wherein said concentrating means includes said electrostatic chamber including high voltage electrodes and a ground electrically connected to said articles to be coated positioned within said chamber.

33. The coating apparatus of claim 1 wherein said coating material supplying means includes a coating material powder reservoir, said powder reservoir having an inclined trough, means for vibrating said trough connected to said trough, said trough having an exit positioned above said inlet of said chamber whereby powder enters said chamber upon activation of said vibrating means, said carrier gas flow providing means and said coating material supplying means including a gas flow injection chamber, said injection chamber receiving powder from said reservoir, the particulates of said powder being entrained by said gas flow, said gas flow injection chamber being axially aligned with said coating chamber, said injection chamber having a powder entrance, a gas entrance, end a powder exit, said gas entrance and said powder exit being positioned at opposite ends of said injection chamber, said powder entrance being positioned near said gas entrance, a diffuser, said diffuser receiving said particulates from said injection chamber, said diffuser being a diverging frustal conical section continuous with and coaxial of said gas flow injection chamber, and said means for transporting including a conveyor for positioning said articles to be coated within said chamber, said conveyor comprising a support mount and a conveying mechanism which is transported upon said mount, said mount including support arms for said articles to be coated.

34. The coating apparatus of claim 33 wherein said coating chamber includes high voltage electrodes and low voltage biasing means, said low voltage biasing means being electrically connected to said articles to be layed said articles being positioned within said chamber, said chamber being an enclosure having inclined walls and an inclined ceiling and a floor, said chamber contiguous with and aligned with said diffuser, said chamber having a plurality of electrodes extending longitudinally through said enclosure.

35. The coating apparatus of claim 33 further comprising an exhaust system placed within said chamber, said exhaust system partially removing excess powder and assisting the transport of said powder longitudinally through said chamber, said exhaust system being an exhaust duct located near the top of said chamber and positioned longitudinally thereof.

36. A method for applying coating material to a substrate comprising the steps of dispersing coating material into a carrier gas, isolating said carrier gas from the ambient atmosphere, transporting said substrate through said carrier gas, inducing movement of said carrier gas relative said substrate, deflecting said carrier gas spaced apart from said moving substrate in the general direction of said substrate, propelling coating material separated from said moving substrate towards said substrate by maintaining a voltage differential between said substrate and an electrode sufficient to form a corona discharge, contacting said substrate with a portion of said coating material, retaining on said substrate at least a portion of said coating material contacting said substrate, channeling said carrier gas through an area about said substrate, and settling said coating material, confining said coating material in close proximity to said substrate while allowing undeposited particulates to escape confinement into a particulate recovery zone.

37. A method for applying coating material to discrete objects comprising the steps of dispersing coating material into a carrier gas, isolating said carrier gas from the ambient atmosphere, transporting said objects through said carrier gas, inducing movement of said carrier gas relative to said objects, deflecting said carrier gas spaced apart from said moving objects in the general direction of said objects, propelling coating material separated from said moving objects towards said objects by maintaining a voltage differential between said objects and an electrode sufficient to form a corona discharge, contacting said objects with a portion of said coating material, retaining on said objects at least a portion of said coating material contacting said objects, channeling said carrier gas through an area about said objects and settling said coating material.

* * * * *